Dec. 1, 1925.
C. B. REDRUP
1,563,789
VALVE MECHANISM OF INTERNAL COMBUSTION ENGINES
Filed Nov. 29, 1924   2 Sheets-Sheet 1
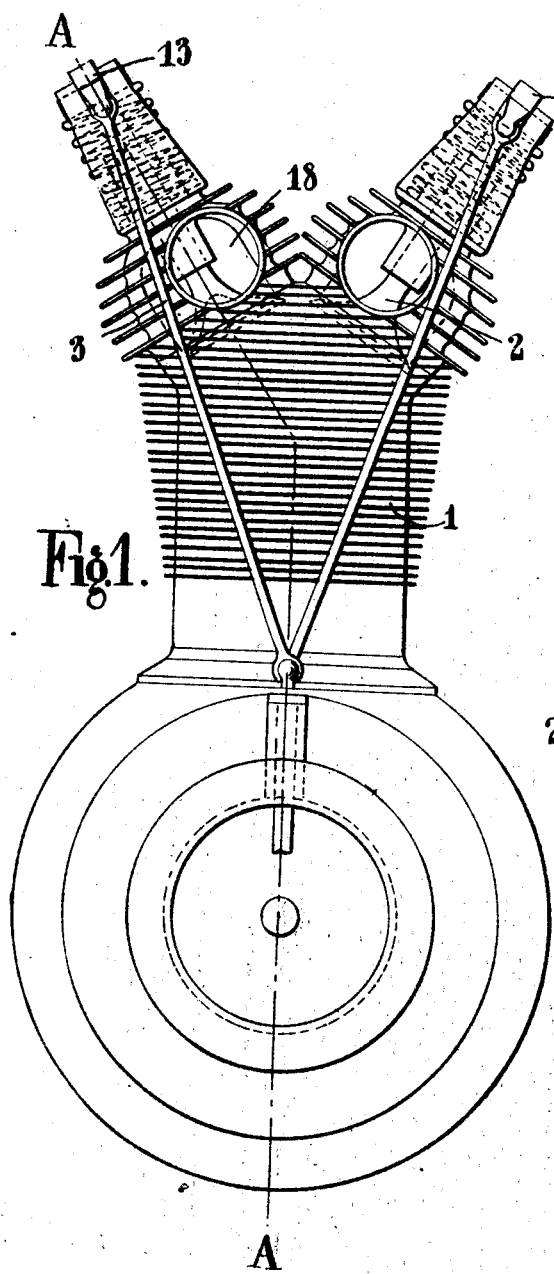
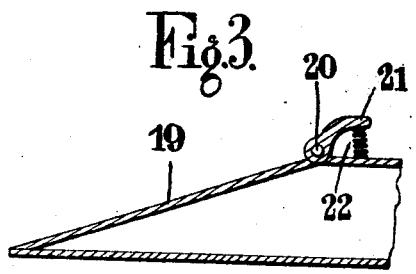
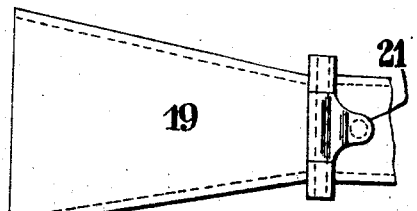
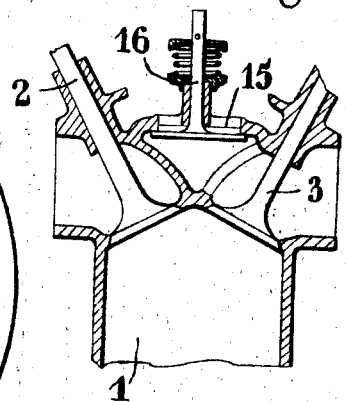
Inventor
C. B. Redrup
By Marks & Clerk
Attys.

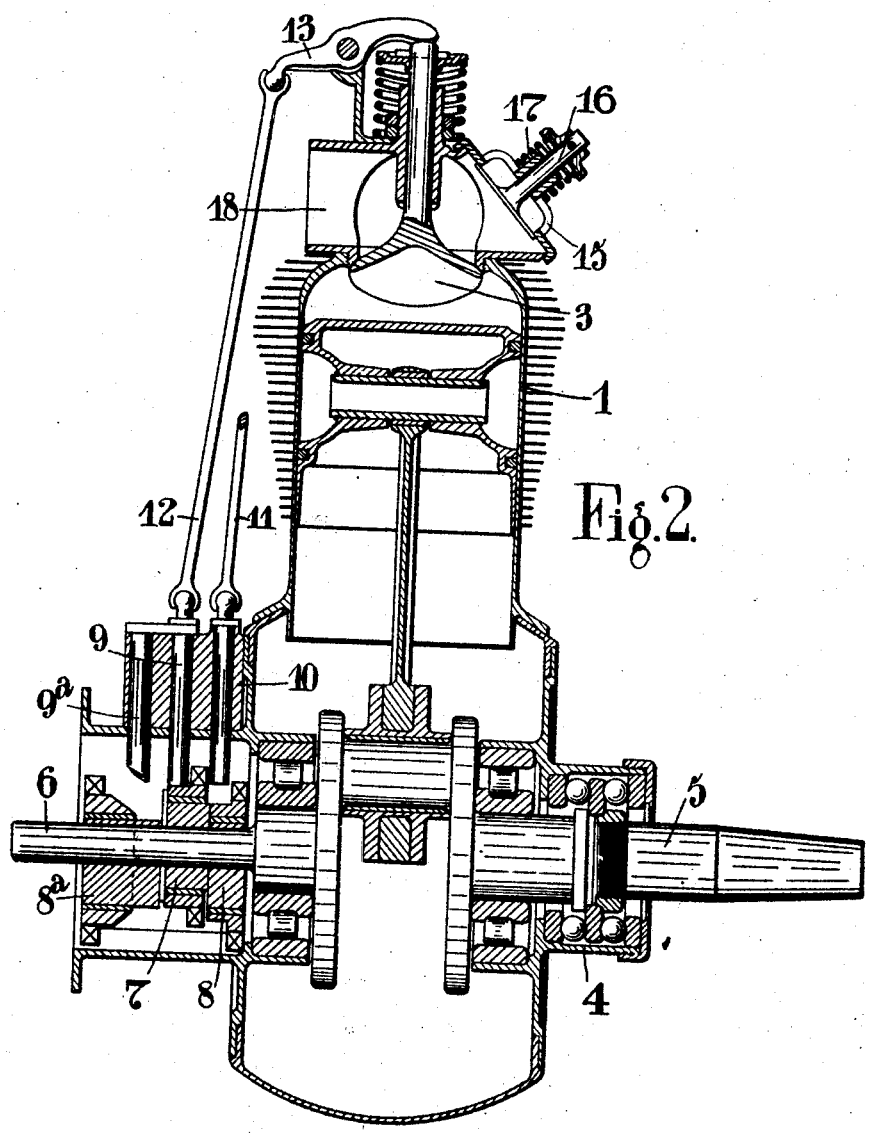

Patented Dec. 1, 1925.

1,563,789

UNITED STATES PATENT OFFICE.

CHARLES BENJAMIN REDRUP, OF LEEDS, ENGLAND.

VALVE MECHANISM OF INTERNAL-COMBUSTION ENGINES.

Application filed November 29, 1924. Serial No. 752,964.

*To all whom it may concern:*

Be it known that I, CHARLES BENJAMIN REDRUP, a British subject, and residing at Heather View, Lawnswood, Leeds, Yorkshire, England, have invented certain new and useful Improvements in and Relating to the Valve Mechanism of Internal-Combustion Engines (for which I have filed application in Great Britain, No. 28,651, Nov. 14, 1923), of which the following is a specification.

This invention relates to the valve mechanism of internal combustion engines.

It has already been proposed in connection with internal combustion engines to provide a spring-controlled air valve opened on every suction stroke of the engine so that it passes air into the exhaust valve chamber to cool the same, a part of the air also entering the engine cylinder with the charge which enters through the inlet valve situated adjacent to the exhaust valve.

Further, in engines of the governed type it has been proposed to provide an air valve through which air enters the cylinder in passing over the exhaust valve when the latter is held up in governing, a flap valve being provided to prevent backward flow of the exhaust gases to the cylinder.

The object of the present invention is to devise improvements in the construction and arrangement of the valve mechanism of internal combustion engines which will increase the efficiency of the engine and enable the same to develop high power while at the same time enabling the exhaust valve and other adjacent parts to be maintained in a relatively cool condition throughout the working of the engine.

The invention consists in an internal combustion engine having an automatic or other valve arranged in close proximity to the exhaust valve but outside the combustion space through which a current of cool air is drawn both by the action of the discharging exhaust gas and by the suction of the engine taking in air for the combustible mixture, the arrangement being such that the maximum amount of cool air is drawn over the exhaust valve and aperture when the engine is delivering its maximum power, while at each successive exhaust discharge the exhaust valve pocket and exhaust pipe is completely scavenged.

The invention also consists in an internal combustion engine of the above character in which the inlet and exhaust valves are arranged adjacent to one another in a spherical or other head of the cylinder, the air inlet valve being situated above or at the back of or in close proximity to the exhaust valve.

The invention also consists in other details and arrangements hereinafter described or indicated.

Reference will now be made to the accompanying drawings in which:—

Figure 1 illustrates a typical example of an internal combustion engine embodying the invention;

Figure 2 illustrates a sectional elevation taken on line A—A of Figure 1;

Figure 3 illustrates the end of the exhaust pipe of the engine, the silencer and connection with the engine being omitted for clearness;

Figure 4 is a plan view of Figure 3;

Figure 5 is a sectional elevation of a modified form of cylinder head.

The cylinder 1 of the engine is preferably provided with a spherical head, the inlet and exhaust valves, which may be of the mechanically operated poppet or other type, being indicated by 2 and 3 respectively. A crank case 4 is provided having the crank shaft 5, the spigot end 6 of which is provided with suitable cams or eccentrics 7 and 8 for operating the tappets 9 and 10. An auxiliary exhaust tappet $9^a$ is rigidly connected with the tappet 9 and may be operated by the cam or eccentric $8^a$, for operating the exhaust valve 3 during the suction stroke, to admit auxiliary air to the cylinder. The rods 11 and 12 are provided with suitable cup and ball connections with the tappets 9 $9^a$ and 10 and also with the levers 13 and 14 which serve to operate the inlet and exhaust valves 2 and 3.

It will be noted that the inlet and exhaust valves are arranged adjacent to one another in the spherical head and at the back of the exhaust valve is an air inlet port 15 normally closed by a valve 16 under influence of the spring 17. This valve is automatic in its movement but if desired it may be mechanically operated and positively opened or closed. The valve 16 will be caused to open and allow air to enter through the opening 15 by the injector action of the exhaust gases which pass through the opening 18. The entrance of air through the opening 15 will also be influenced by the suction of the engine when the exhaust valve is open.

In the modified form of cylinder head illustrated in Figure 5, the air inlet port 15 and valve 16 are arranged between the inlet valve 2 and exhaust valve 3.

With the object of preventing any return movement of the exhaust gases during the auxiliary opening of the exhaust valve 3, the exhaust pipe may be provided with an outlet valve as shown in Figure 3 which comprises a flap 19 pivoted at 20 and having a rear extension 21. The flap is kept normally closed by the engagement of the extension 21 with a spring 22, the valve opening upwardly to allow of the passage of exhaust gases. By providing the valve in the exhaust pipe, any possible backward flow of exhaust gases during the auxiliary opening of the exhaust valve on the induction stroke for admitting air to the cylinder is prevented, such admission of air being particularly desirable when running at high speed and with full throttle open. The air so entering passes over the exhaust valve or valves and pipes or surrounding parts and simultaneously with the auxiliary opening of the exhaust valve or valves to admit the air supply a richer mixture is provided from the carburetor through the induction valve in order to maintain a correct combustible mixture, thus obtaining the fullest possible volumetric efficiency of the cylinder.

If it is desired the exhaust valve and carburetor throttle may be interconnected by suitable means so that the maintenance of the correct mixture may be automatic.

Furthermore, in order to obtain the most beneficial results from the invention there may be employed an exhaust valve which is considerably larger in area than the inlet or induction valve.

It will be understood, however, that the invention is not to be limited to any particular form or number of valves employed nor to the particular means for actuating the same either automatically or mechanically nor to the particular manner in which the valves are arranged in the cylinder, as these and other details may be variously modified depending upon the type or construction of engine to which the invention is to be applied or any practical requirements that may have to be fulfilled.

Having now described my invention, what I claim as new and desire to secure by Letters Patent is:—

1. In an internal combustion engine, a cylinder provided with an intake and an exhaust port, engine operated valves for controlling said ports, an exhaust gas passageway communicating with the exhaust port, an atmospheric port in the exhaust gas passageway arranged in close proximity to the exhaust valve and functioning to admit atmospheric air to said passageway during the exhaust stroke for cooling the passageway and exhaust valve, a valve for controlling the atmospheric port, and means for opening the exhaust valve during the suction stroke to permit the atmospheric port valve to also admit cooling air to the passageway, for cooling the exhaust valve during the suction stroke of the engine.

2. An internal combustion engine as claimed in claim 1 in which said passageway is provided with means to prevent backward flow of exhaust gases to the cylinder during the suction stroke of the engine.

3. An internal combustion engine including a cylinder provided with an intake port and an exhaust port, a crank shaft, a piston in the cylinder operatively connected to the crank shaft, intake and exhaust valves for controlling said ports, an exhaust gas passageway arranged exteriorly of the cylinder and communicating with the exhaust port, an atmospheric port associated with said passageway and arranged in close proximity to the exhaust valve for admitting fresh air into the passageway during the exhaust stroke of the engine for cooling the passageway and the exhaust valve, an atmospheric valve for controlling the last mentioned port means actuated by the crank shaft for controlling the opening and closing of the intake valve, means actuated by the crank shaft for controlling the opening and closing of the exhaust valve, and auxiliary means associated with the last mentioned means for opening the exhaust valve during the suction stroke of the engine, so that cooled air will be drawn through the atmospheric port and past the atmospheric and exhaust valves into the cylinder during said suction stroke.

In testimony whereof I have signed my name to this specification.

CHARLES BENJAMIN REDRUP.